United States Patent [19]
Aoki

[11] Patent Number: 5,121,199
[45] Date of Patent: Jun. 9, 1992

[54] COLOR IMAGE SENSOR DEFECT DETECTOR USING DIFFERENTIATED I AND Q VALUES

[75] Inventor: Hiroyuki Aoki, Gyoda, Japan

[73] Assignee: Advantest Corporation, Tokyo, Japan

[21] Appl. No.: 647,489

[22] Filed: Nov. 29, 1990

[30] Foreign Application Priority Data

Dec. 1, 1989 [JP] Japan .................. 1-312364

[51] Int. Cl.⁵ .................. H04N 1/04; H04N 1/40
[52] U.S. Cl. .................. 358/80; 358/406; 358/483; 355/203
[58] Field of Search .................. 358/75, 80, 79, 406, 358/482, 483, 213.11, 213.15, 213.18, 213.27, 483, 474; 355/203.52, 204, 209

[56] References Cited

U.S. PATENT DOCUMENTS

| | | | |
|---|---|---|---|
| 3,778,541 | 12/1973 | Bowker | 358/75 |
| 4,772,958 | 9/1988 | Suzuki et al. | 358/483 |
| 4,811,047 | 3/1989 | Hosaka et al. | 355/209 |
| 4,839,721 | 6/1989 | Abdulwahab et al. | 358/80 |

FOREIGN PATENT DOCUMENTS

| | | | |
|---|---|---|---|
| 3420359 | 12/1984 | Fed. Rep. of Germany | 358/483 |
| 2163620 | 2/1986 | United Kingdom | 358/406 |

Primary Examiner—Jin F. Ng
Assistant Examiner—Jill Jackson
Attorney, Agent, or Firm—Staas & Halsey

[57] ABSTRACT

In a color image signal evaluating apparatus and method, a color image signal corresponding to each pixel position on a display screen is converted by a color signal converter to an I signal and a Q signal, which are stored, as pixel data, in first and second image memories, each at an address corresponding to the pixel position. The I signal and Q signal read out of the first and second image memories are differentiated by first and second differentiators, respectively, with respect to the directions of pixel arrays to thereby obtain an I-signal differentiated value and a Q-signal differentiated value at each pixel position. A vector-composed value of the I-signal differentiated value and the Q-signal differentiated value at each pixel position is calculated and is stored in a third image memory. An evaluation part represents, as a factor of the degree of a color reproduction error, the magnitude of a change in the differentiated vector-composed value stored in the third image memory and compares the factor with a fixed value, thereby determining whether or not the color reproduction error is within a given limit range.

5 Claims, 4 Drawing Sheets

COLOR IMAGE SENSOR DEFECT DETECTOR USING DIFFERENTIATED I AND Q VALUES

BACKGROUND OF THE INVENTION

The present invention relates to a method and apparatus for evaluating color image signals available from, for example, CCD color image sensors fabricated as semiconductor IC's.

Heretofore there have been put to practical use a wide variety of semiconductor CCD color image sensors which have mosaic color filters or stripe color filters coated on their front for creating color image signals.

The semiconductor CCD image sensors are produced using the IC technology but they may sometimes be defective from various causes in their manufacturing process. In the case of the color image sensor, in particular, color reproduction errors such as shading shown in FIG. 1 and stripes of colors shown in FIG. 2 are induced owing to defects of the image sensor itself. The shading in FIG. 1 is a color reproduction error that the reproduced picture, which ought to be white, is colored over a wide area (at the upper left in FIG. 1). The bands of colors in FIG. 2 are slanted or vertical colored stripes which appear in the reproduced picture which ought to be white.

Conventionally, such color reproduction errors are detected through visual inspection of a display image provided on a CRT display screen by the color image signal output from the color image sensor shed evenly all over its light receiving surface by standard white light. The conventional testing of color image sensors thus involves direct visual inspection of the color reproduction errors by test personnel, and hence is inefficient. Further, the traditional inspection of color image sensors calls for many test personnel at the mass-production site, in particular; consequently, this goes against labor saving and does not lead to the reduction of manufacturing costs of color image sensors. Besides, clear-cut color patterns can be detected without any individual difference among test personnel but pale color patterns may sometimes escape particular test personnel's notice.

SUMMARY OF THE INVENTION

It is therefore an object of the present invention to provide a color image signal evaluating method which permits automatic detection of color reproduction errors which are induced in color image signals available from color image sensors or the like.

Another object of the present invention is to provide a color image signal evaluating apparatus utilizing the above-mentioned method.

According to the color image signal evaluating method of the present invention, a color image signal to be evaluated is separated into an I signal and a Q signal, which are stored in first and second image memories each having addresses corresponding to respective pixel positions. The I signal and the Q signals thus stored in these image memories are each differentiated with respect to the direction of each pixel array, the differentiated I and Q signals are vector-composed and then written into a third image memory. The differentiated vector-composed value thus written into the third image memory is used to calculate a factor representing the size of the color reproduction error or colored pattern. It is determined if the color image sensor is good or not, depending upon whether or not the factor is greater than a predetermined value.

The color image evaluating apparatus of the present invention includes: color signal converting means for converting a color image signal into I and Q signals; first and second image memories for storing the I and Q signals at addresses corresponding to respective pixel positions; first and second differentiating means whereby the I and Q signals read out of the first and second image memories are each differentiated with respect to the direction of each pixel array; vector calculating means for vector-composing the differentiated I and Q signals and for calculating a differentiated vector-composed value; a third image memory for storing the differentiated vector-composed value; and an evaluation part for calculating from the differentiated vector-composed value in the third image memory a factor representing the size of a colored pattern or color reproduction error and comparing the factor with a predetermined value to determine if the color image sensor under test is good or not.

According to the present invention, the I and Q signals are each differentiated in the direction of each pixel array and the differentiated I and Q signals are composed with vectors. The differentiated vector-composed value thus obtained eliminates the influence of color shading and undergoes a marked change when color variations are locally distributed. When the color difference is large, the differentiated value undergoes a particularly sharp and substantial change. Consequently, by detecting those areas of the display image where the differentiated value is great, it is possible to detect stripes or islands of colors which appear locally in the display image.

BRIEF DESCRIPTION OF THE DRAWINGS

FIG. 8 is a diagram illustrating example of a differentiating filter;

FIG. 9 is a diagram illustrating another example of the differentiating filter; and FIG. 10 is a diagram illustrating still another example of the differentiating filter.

DESCRIPTION OF THE PREFERRED EMBODIMENTS

Figure 1:
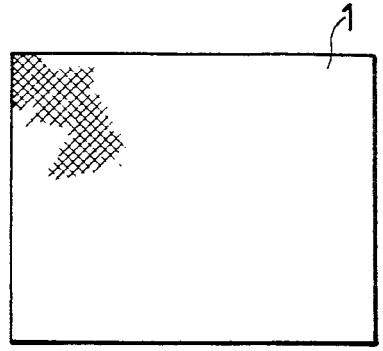
FIG. 1 is a diagram showing an example of a color reproduction error which appears in a display image.
Figure 2:
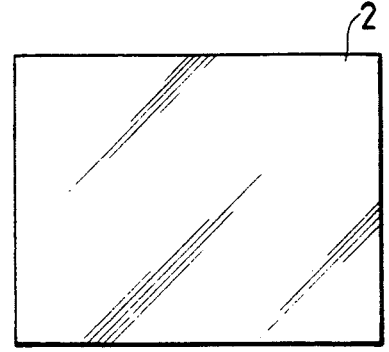
FIG. 2 is a diagram showing another example of a color reproduction error appearing in the display image.
Figure 3:
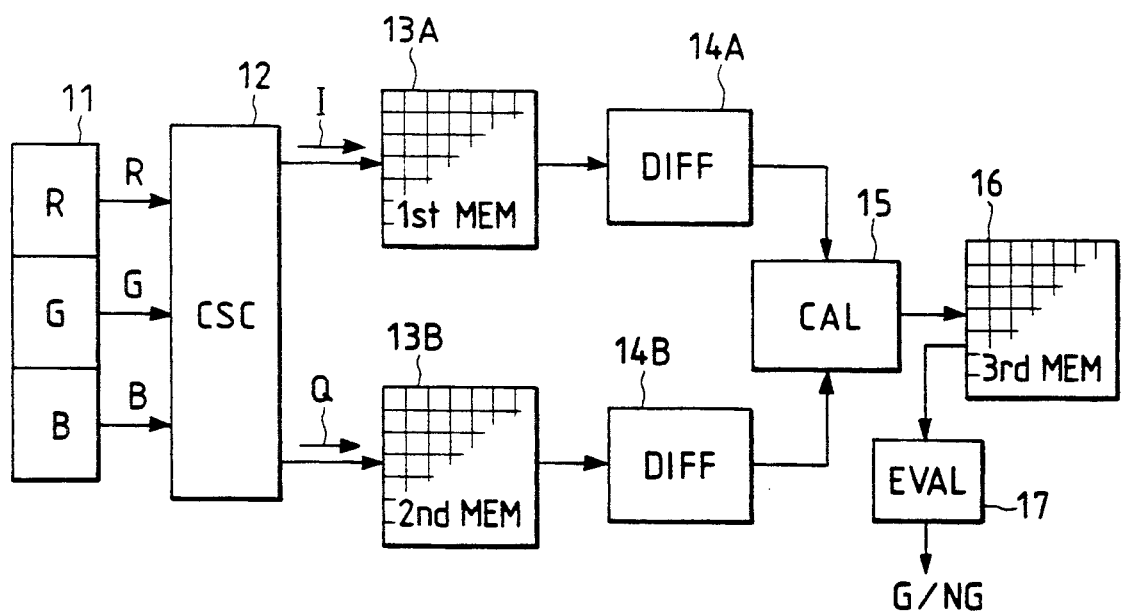
FIG. 3 is a block diagram illustrating an embodiment of the present invention.

Referring now to FIG. 3, an embodiment of the present invention will be described. Reference numeral 11 indicates a color image signal source, which can be formed by a color imaging device employing a solid-state image sensor such as a CCD. In this embodiment the signal source 11 is assumed to produce monochromatic signals R, G and B individually, which are applied to a converter 12 for conversion into I and Q signals.

As is well-known in the art, the I and Q signals and a luminance signal Y are defined as follows:

$Y = 0.30R + 0.59G + 0.11B$ $I = 0.60R - 0.28G - 0.32B$ $Q = 0.21R - 0.52G - 0.31B$

In the above, R, G and B indicate red, green and blue monochromatic signals. When the monochromatic signals R, G and B are all 1's, the luminance signal Y goes to a 1 and the I and Q signals both 0's.

Figure 4:
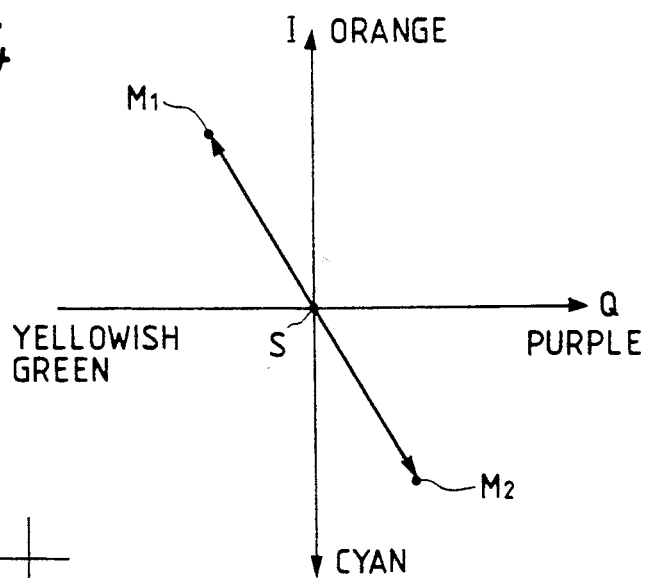
FIG. 4 is a graph for explaining the vector of a color signal.

That is, when the monochromatic signals R, G and B are all 1's, a white image is created. The I and Q signals are represented by orthogonal coordinates shown in FIG. 4, and a color and its depth are specified at each coordinate position on the orthogonal coordinates. The origin S represents white color. The Q axis represents purple toward the positive side and yellowish green toward the negative side, whereas the I axis represents orange toward the positive side and cyan toward the negative side.

According to the present invention, the I signal and the Q signal are stored in a first image memory 13A and a second image memory 13B, each having addresses corresponding to pixels on the light receiving surface of an image sensor. In this embodiment, with a view to reducing the total amount of data to thereby increase the throughput of data processing, the original color image signal is split into blocks each composed of, for example, 10 × 10 pixels, and mean values of data of the I and Q signals are obtained for each block, and the mean values are stored, as pieces of one-pixel data, in the order of addresses. Consequently, the frame size is reduced down to 1/10 in both of the vertical and lateral directions. The following description will be given in connection with the case processing the data of such a reduced frame, but it is a matter of course that the original data may be processed without reducing the frame size.

The pieces of data of the I and Q signals stored in the first and second image memories 13A and 13B are read out therefrom for each same pixel position and differentiated by differentiators 14A and 14B, respectively.

Figure 5:
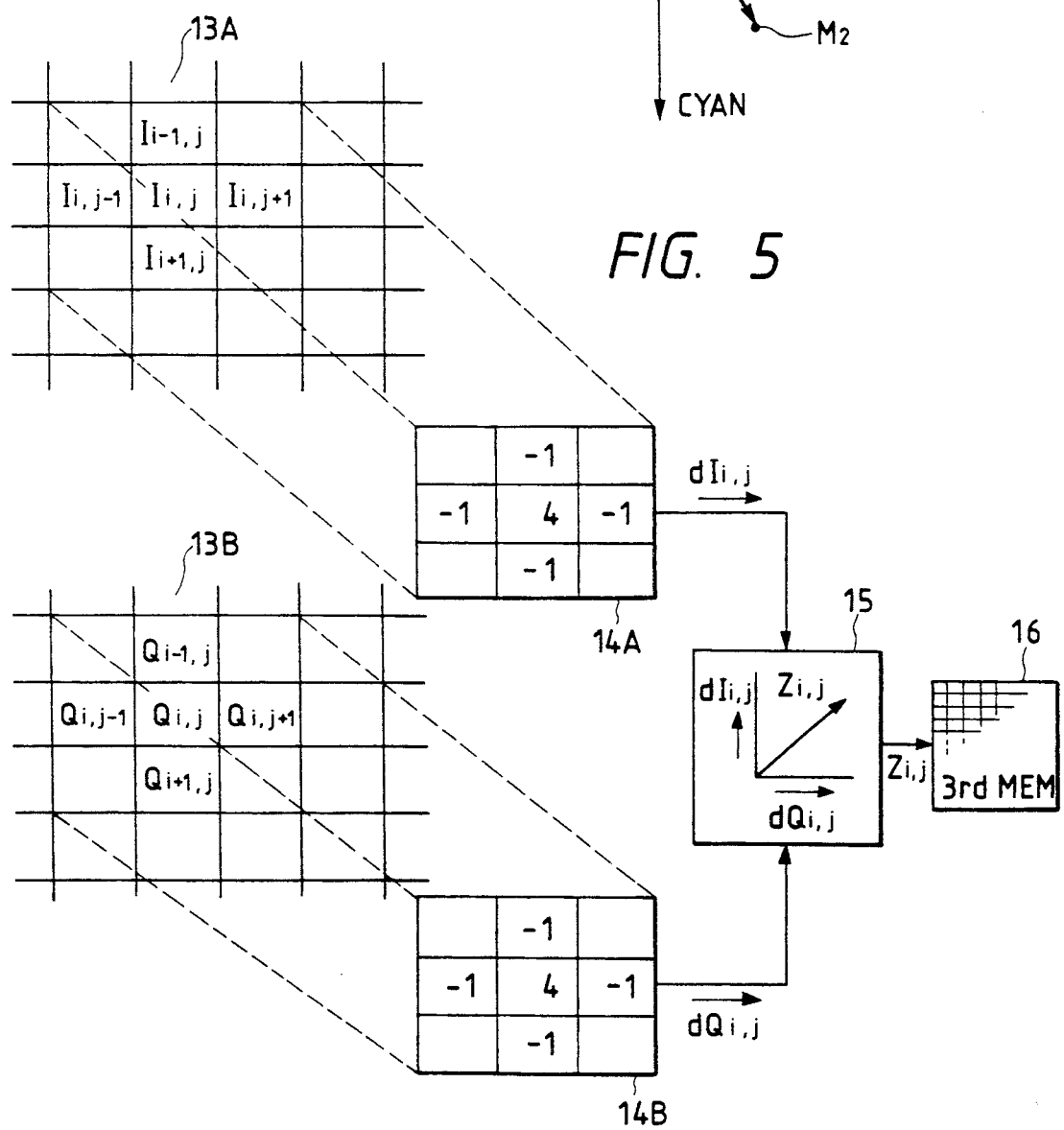
FIG. 5 is a block diagram for explaining the construction and operation of a differentiating device.

Now, a description will be given, with reference to FIG. 5, of the operation of each of the differentiators 14A and 14B. The pieces of data written in lattices denoted by 13A and 13B representing the first and second image memories, indicate pixel data on the pixel positions which are used for calculating a differentiated value at the pixel position (i, j), and numeric values written in lattices denoted by 14A and 14B representing differentiators, indicate coefficients by which the corresponding data in the memories 13A and 13B are to be multiplied for differentiations described later. The differentiated value is the sum total of the results of such multiplications, and consequently, the numeric values written in the differentiators 14A and 14B in FIG. 5 and their positions express the differentiation processing of the differentiators 14A and 14B. In this example, letting the pixel data at an arbitrary pixel position (i, j) be represented by $I_{ij}$, this pixel data is quadrupled, and pieces of pixel data $I_{i-1,j}$ and $I_{i+1,j}$ corresponding to pixel positions (i−1, j) and (i+1, j) adjacent in the vertical direction and pieces of pixel data $I_{i,j-1}$ and $I_{i,j+1}$ corresponding to pixel positions adjacent in the lateral direction are subtracted from the quadrupled data value to thereby compute the differentiated value at the pixel position (i, j). The Q signal is also subjected to similar processing. That is, the differentiated outputs of the I and Q signals, $dI_{i,j}$ and $dQ_{i,j}$, are obtained as follows:

$$dI_{i,j} = (4I_{i,j} - I_{i-1,j} - I_{i+1,j} - I_{i,j-1} - I_{i,j+1}) \quad (1)$$

$$dQ_{i,j} = (4Q_{i,j} - Q_{i-1,j} - Q_{i+1,j} - Q_{i,j-1} - Q_{i,j+1}) \quad (2)$$

As will be seen from Eq. (1), when the pixel data of the I signal does not change in the lateral direction and in the vertical direction of the frame, or when it is linearly increasing or decreasing, the differentiated output $dI_{i,j}$ is reduced to zero, and when the pixel data undergoes other nonlinear changes, they are detected as values which are not zero usually. The same processing applies to the Q signal. In other words, that the differentiators 14A and 14B perform, for the I and Q signals, the processes expressed by Eqs. (1) and (2) means that these signals are applied to differentiating filters having characteristics expressed by Eqs. (1) and (2), respectively. The starting pixel position (i, j) is gradually moved in the direction of line scanning and color pixel data over the entire area of the frame (the reduced frame in this case) is differentiated with respect to each direction of pixel array. In this instance, a composite differentiated output is obtained which is composed of differentiated outputs in the vertical and lateral directions.

The differentiated outputs $dI_{i,j}$ and $dQ_{i,j}$ at each pixel position, differentiated by the differentiators 14A and 14B, respectively, are vector-composed by a calculating part 15. The vector calculation is performed as follows:

$$Z_{i,j} = \sqrt{(dI_{i,j})^2 + (dQ_{i,j})^2} \quad (3)$$

The result of calculation by the calculating part 15 is written in a third image memory 16 at an address corresponding to each pixel position (i, j). The differentiated vector-composed value written in the third image memory 16 represents the absolute value of the amount of change of the color signal.

Figure 6:
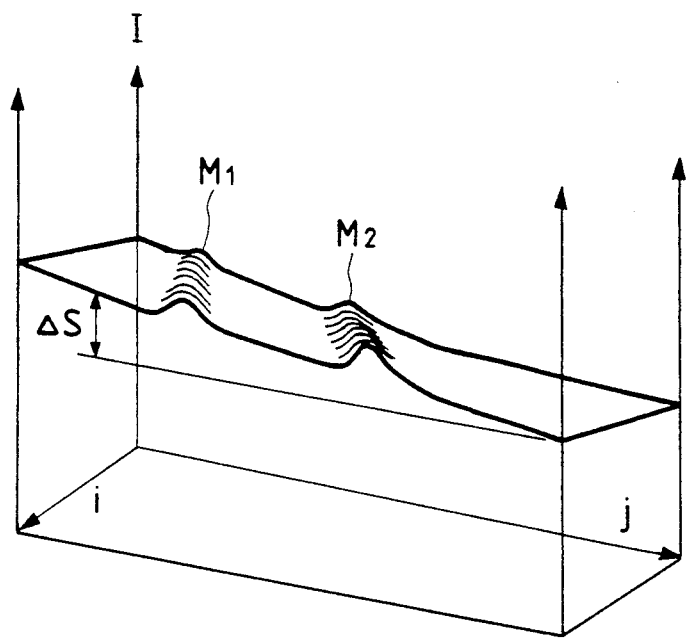
FIG. 6 is a diagram schematically showing a color signal before differentiation.

FIG. 6 is a graph showing an example of the data of the color signal I stored in the first image memory 13A prior to the differentiation. The slope ΔS in FIG. 6 indicates the influence of color shading, and mountains $M_1$ and $M_2$ appearing in the slope ΔS indicate stripes of colors.

Figure 7:
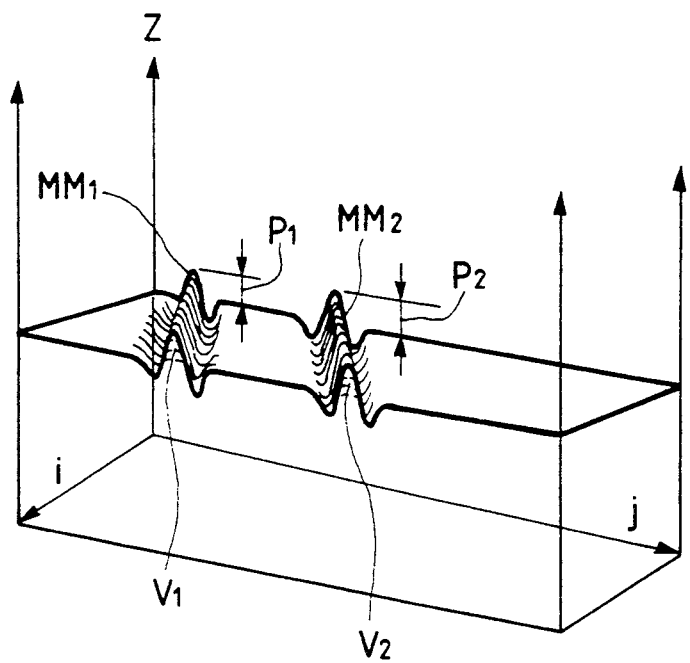
FIG. 7 is a diagram schematically showing a differentiated, vector-composed color signal.

FIG. 7 is a graph showing an example of the differentiated vector-composed value Z stored in the third image memory 16. The differentiation eliminates the slope ΔS resulting from color shading, shown in FIG. 6, and emphasizes the mountains $M_1$ and $M_2$, as indicated by $NM_1$ and $NM_2$.

As described above, the differentiated vector-composed values Z, which are stored in the third image memory 16, are free from the influence of color shading but instead a stripe- or island-shaped colored area is emphasized by the differentiating operation. That is, even if a color varies gently, the variation is emphasized by the differentiation before the value Z is input into the third image memory 16.

An evaluation part 17 sequentially reads out the differentiated vector-composed values $Z_{i,j}$ written in the third image memory 16 and, based on their variations, that is, the heights of peaks $P_1$ and $P_2$, volumes $V_1$ and $V_2$ and plane areas $A_1$ and $A_2$ of the mountains $NM_1$ and $NM_2$ depicted in FIG. 7, determines whether or not the color reproduction errors are within a given limit range, then yields an output of evaluation of the color image signal, i.e. an output indicating whether the signal is good (G) or no good (NG).

The factor F representing the degree of a colored pattern, for instance, can be given as follows:

$$F = K_1 \cdot P + K_2 \cdot A + k_3 \cdot V \quad (4)$$

where P, A and V are peak, area and volume parameters of the mountains of the above-mentioned differentiated vector-composed values, respectively. The coefficients $k_1$, $k_2$ and $k_3$ are constants which are determined experimentally. The factor F is compared with a predetermined value, and depending on whether the former is smaller or greater than the latter, the detected color reproduction error is determined to fall inside or outside the given limit range.

The peak parameter P may be, for example, the larger one of the peaks of the mountains $NM_1$ and $NM_2$ shown in FIG. 7, or an average value of peak values exceeding a predetermined value, or it may be determined by some other methods. The area parameter A may also be, for example, the sum total of those of horizontal cross-sectional areas of the mountains $NM_1$ and $NM_2$ at a predetermined height which are in excess of a predetermined value, or a maximum one of such cross-sectional areas, or it may also be determined by some other methods. The volume parameter V may also be determined using various methods. As regards that one of the parameters P, A and V which is not used, the value of the corresponding one of the coefficients $k_1$, $k_2$ and $k_3$ needs only to be reduced to zero.

While in the above the differentiators 14A and 14B have been described to perform the differentiation filter processing for obtaining the differentiated value by subtracting pixel data $I_{i,j-1}$, $I_{i,j+1}$, $I_{i-1,j}$, $I_{i+1,j}$, and $Q_{i,j-1}$, $Q_{i,j+1}$, $Q_{i-1,j}$, $Q_{i+1,j}$ at pixel positions adjacent an arbitrary pixel position (i, j) from a value which is obtained by multiplying the pixel data $I_{i,j}$, $Q_{i,j}$ at the pixel position (i, j) by a coefficient, it is also possible to employ a differentiation filter in which each pixel data to be subtracted is pixel data at an address apart from the center pixel position by one pixel. The differentiation sensitivity and the differentiation characteristic can be adjusted by arbitrarily setting the distance from the center pixel position to the pixel position of the pixel data to be subtracted.

Figures 8, 9, 10:
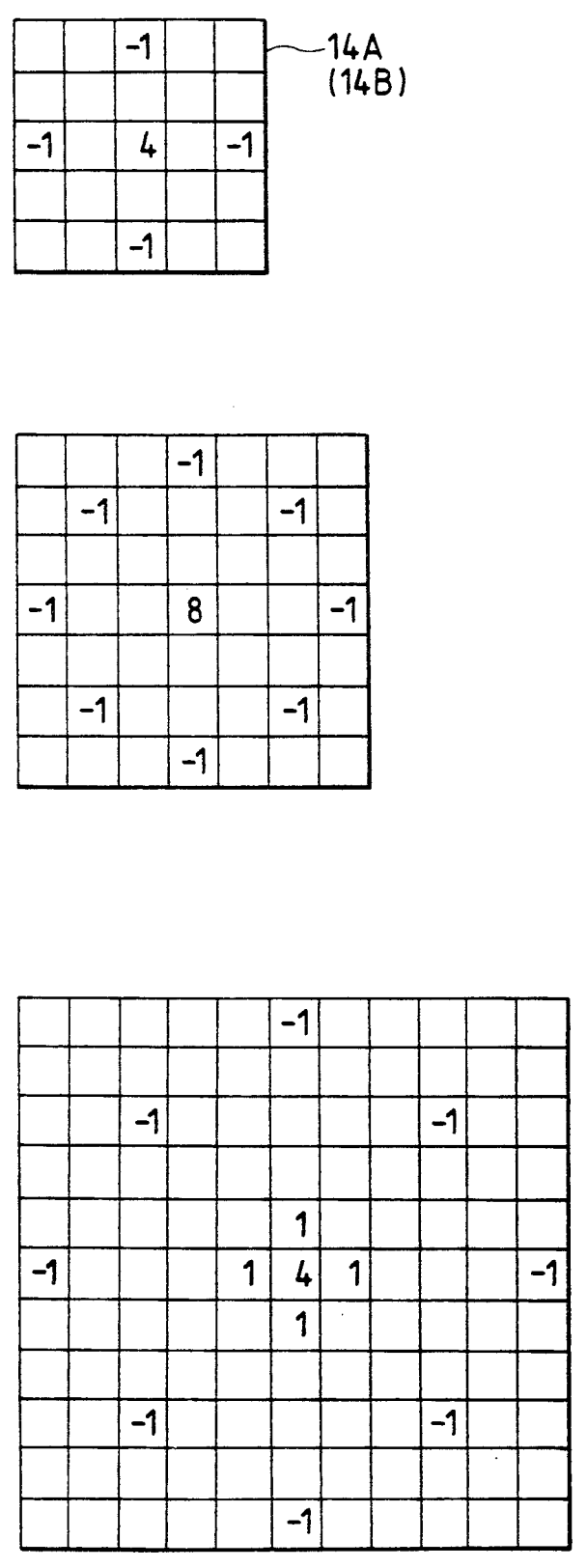

It is also possible to additionally use data at pixel positions lying diagonally of the center pixel position as shown in FIG. 9. Further, pixel data may be added to that at the center pixel position as depicted in FIG. 10. By suitably selecting the positions and the numbers of such additional pieces of pixel data, a differentiation filter of a desired characteristic can be implemented.

It will be apparent that many modifications and variations may be effected without departing from the scope of the novel concepts of the present invention.

What is claimed is:

1. Color image signal evaluating apparatus comprising:

color signal converting means whereby a color image signal corresponding to each pixel position on a display screen is converted to an I signal and a Q signal;

first and second image memory means for storing said I signal and said Q signal, as pixel data, at an address corresponding to said each pixel position, respectively;

first and second differentiation processing means whereby said I-signal pixel data and said Q-signal pixel data read out of the corresponding addresses of said first and second image memories are sequentially differentiated with respect to the directions of pixel arrays and the resulting I-signal differentiated value and Q-signal differentiated value are output, respectively;

calculating means for vector-composing said I-signal differentiated value and said Q-signal differentiated value from said first and second differentiation processing means and outputting the resulting vector-composed value;

third image memory means for storing each differentiated vector-composed value from said calculating means at the corresponding address; and evaluating means whereby the magnitude of a change in said differentiated vector-composed value read out of said third image memory means is calculated as a factor representing the degree of a color reproduction error, and said factor is compared with a predetermined value to determine whether or not said color reproduction error is within a given limit range.

2. A color image signal evaluating method comprising:

a step wherein a color image signal corresponding to each pixel position on a display screen is converted to an I signal and a Q signal;

a step wherein said I signal and said Q signal are stored, as pixel data, in first and second image memories at an address corresponding to said each pixel position;

a step wherein said I-signal pixel data and said Q-signal pixel data are read out of the corresponding addresses of said first and second image memory means, respectively, and are sequentially differentiated with respect to the directions of pixel arrays to thereby obtain an I-signal differentiated value and a Q-signal differentiated value corresponding to each pixel position;

a step wherein said I-signal differentiated value and said Q-signal differentiated value are vector-composed to thereby obtain a differentiated vector-composed value for each pixel position;

a step wherein said differentiated vector-composed value at each pixel position is stored in a third image memory at the corresponding address; and a step wherein the magnitude of a change in said differentiated vector-composed values stored in said third image memory is calculated as a factor representing the degree of a color reproduction error and said factor is compared with a predetermined value to thereby determine whether or not said color reproduction error is within a given limit range.

3. The method of claim 2, wherein, letting said I-signal differentiated value, said Q-signal differentiated value and said differentiated vector-composed value at each pixel position be represented by dI, dQ and Z, respectively, said differentiated vector-composed value at said pixel position is calculated by the following equation:

$$Z = \sqrt{dI^2 + dQ^2}\ .$$

4. The method of claim 2, wherein letting said factor be represented by F and letting peak, area and volume parameters of a mountain of a change in said differentiated vector-composed value be represented by P, A and V, respectively, said factor F is defined by the following equation:

$$F = k_1 \cdot P + k_2 \cdot A + k_3 \cdot V$$

where $k_1$, $k_2$ and $k_3$ are predetermined coefficients.

5. The method of claim 3, wherein letting said factor be represented by F and letting peak, area and volume parameters of a mountain of a change in said differentiated vector-composed value be represented by P, A and V, respectively, said factor F is defined by the following equation:

$$F = k_1 \cdot P + k_2 \cdot A + k_3 \cdot V$$

where $k_1$, $k_2$ and $k_3$, are predetermined coefficients.

* * * * *